United States Patent
Marugan et al.

(12)
(10) Patent No.: US 6,455,202 B1
(45) Date of Patent: Sep. 24, 2002

(54) POSITIVE ELECTRODE FOR A LITHIUM RECHARGEABLE ELECTRO-CHEMICAL CELL HAVING AN ALUMINUM CURRENT COLLECTOR

(75) Inventors: Marielle Marugan, Chatenay-Malabry; Stanislas Galaj, Arcueil; Clémence Siret, Bruges; Jean-Paul Peres, Merignac; Phillippe Biensan, Carignan, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/512,665

(22) Filed: Feb. 24, 2000

(30) Foreign Application Priority Data

Feb. 25, 1999 (FR) .............................. 99 02359

(51) Int. Cl.[7] .......................... H01M 4/66; H01M 4/62; H01M 4/02
(52) U.S. Cl. ...................... 429/245; 429/217; 429/223
(58) Field of Search ............... 429/217, 209, 429/245, 233

(56) References Cited

U.S. PATENT DOCUMENTS

| | | | |
|---|---|---|---|
| 4,440,837 A | * | 4/1984 | Shimotake et al. ......... 429/112 |
| 4,980,080 A | * | 12/1990 | Lecerf et al. ............ 252/182.1 |
| 5,340,672 A | * | 8/1994 | Kubota et al. .............. 429/249 |
| 5,378,560 A | | 1/1995 | Tomiyama ................. 429/217 |
| 5,514,496 A | * | 5/1996 | Mishima et al. |
| 5,518,839 A | | 5/1996 | Olsen |
| 5,578,399 A | * | 11/1996 | Olsen ........................ 429/245 |
| 5,580,686 A | | 12/1996 | Jie et al. |
| 5,591,544 A | | 1/1997 | Fauteux et al. ............. 429/209 |
| 6,087,045 A | * | 7/2000 | Fauteux et al. ............. 429/245 |
| 6,214,061 B1 | * | 4/2001 | Visco et al. ............... 29/623.5 |
| 6,235,427 B1 | * | 5/2001 | Idota et al. .............. 429/218.1 |

FOREIGN PATENT DOCUMENTS

WO    WO 97/14188    4/1997

* cited by examiner

Primary Examiner—Carol Chaney
Assistant Examiner—Tracy Dove
(74) Attorney, Agent, or Firm—Sughrue Mion, PLLC

(57) ABSTRACT

The present invention provides a positive electrode for a lithium rechargeable electrochemical cell, the electrode comprising an aluminum current collector and a paste containing both an electrochemically active material and a binder suitable for being put into solution or suspension in water, wherein the surface of said collector is covered in a protective layer constituted by at least one component selected from an oxalate and a compound of at least one element selected from silicon, chromium, and phosphorus.

14 Claims, 1 Drawing Sheet

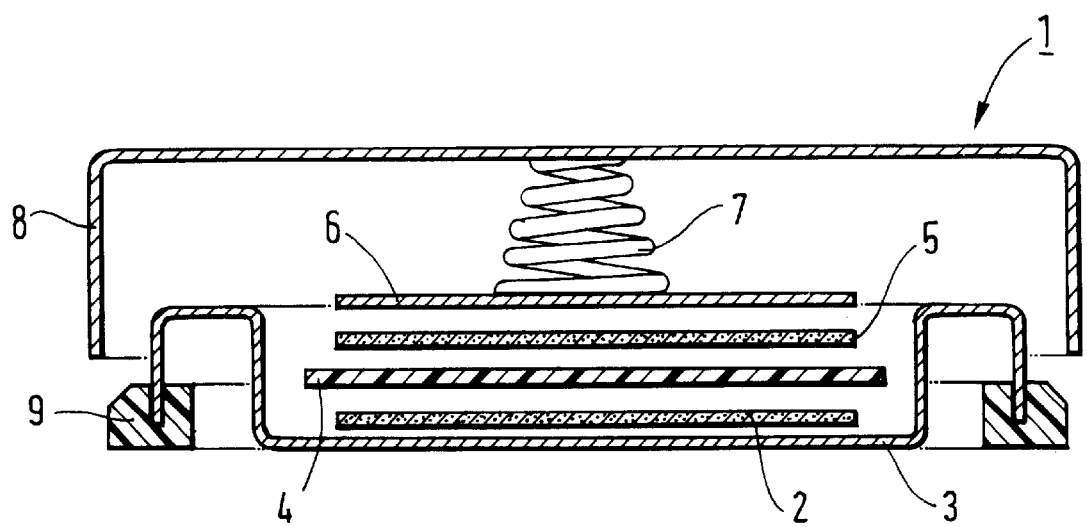

POSITIVE ELECTRODE FOR A LITHIUM RECHARGEABLE ELECTRO-CHEMICAL CELL HAVING AN ALUMINUM CURRENT COLLECTOR

The present invention relates to a positive electrode for a lithium rechargeable electrochemical cell and including a current collector made of aluminum. The invention also extends to a method of manufacturing such a cell and to any electrochemical system including such an electrode.

BACKGROUND OF THE INVENTION

Lithium rechargeable electrochemical cells possess a positive electrode of the paste type comprising a conductive support which serves as a current collector on which there is deposited a paste containing a binder and an electrochemically active material capable of inserting lithium into its structure. The cathode active material is generally a transition metal compound such as an oxide, in particular a lithiated oxide, a sulfide, or a sulfate.

By way of example, the current collector of the positive electrode can be a foil, a perforated foil, a grid, an expanded metal, a felt, or indeed a foam. It is possible to use, in particular, stainless steel, titanium, aluminum, nickel, etc.

The paste is made by putting the binder in solution or suspension in a solvent and then adding it to the active material powder. After coating with the paste, the solvent is eliminated by drying the electrode. Most cathode binders commonly in use today are implemented in an organic solvent. This applies in particular to polyvinylidene fluoride (PVDF) which is dissolved in N-methylpyrrolidone (NMP). However, methods involving organic solvents present drawbacks when implemented at an industrial scale because of the toxicity of the solvents used and because of problems of expense and security associated with recycling a large volume of solvent. Attention has thus been given to binders that are compatible with the use of aqueous solvents.

U.S. Pat. No. 5,378,560 describes a positive electrode for a lithium cell whose support is an aluminum foil which is covered in an aqueous paste comprising the active material which is a lithiated cobalt oxide $LiCoO_2$, a conductive material (graphite), and a binder which is a mixture of sodium polyacrylate and a polymer selected from the copolymers of styrene and butadiene that have a carboxyl group.

However, the Applicant has observed that when an aluminum collector is put into contact with a paste containing water, it suffers from corrosion. Its surface layer of alumina is attacked and gas is given off.

The positive electrode described in U.S. Pat. No. 5,580,683 possesses a metal current collector which may contain aluminum, specifically an aluminum alloy. That document also mentions using water as the solvent when making the paste. The paste is dried before being pressed on the collector. That method avoids putting the aluminum into contact with the aqueous medium of the paste, but it does not solve the problem of collector corrosion when a paste containing water is applied thereto.

In order to lower interface impedance, the surface of an aluminum current collector is covered in a protective primer layer.

U.S. Pat. No. 5,591,544 purposes treating the collector to eliminate the native alumina layer and then to cover its surface in a primer layer containing carbon and possibly also a transition metal oxide suitable for inserting lithium.

Document WO 97/14188 describes a primer layer comprising carbon and an alkali metal polysilicate, which primer is disposed between the current collector and the layer containing the active material.

Such a carbon layer is known to be porous; it does not constitute a reliable barrier against corrosion.

Furthermore, tests performed by the Applicant on commercial collectors coated in a layer of analogous protective carbon have shown that the carbon layer dissolves in the presence of an aqueous paste.

OBJECTS AND SUMMARY OF THE INVENTION

An object of the present invention is to propose a positive electrode for a lithium rechargeable electrochemical cell, in which the aluminum current collector is not corroded when a paste containing water is applied.

The present invention provides a positive electrode for a lithium rechargeable electrochemical cell, the electrode comprising an aluminum current collector and a paste containing both an electrochemically active material and a binder suitable for being put into solution or suspension in water, the electrode being wherein the surface of said collector is covered in a protective layer constituted by at least one component selected from an oxalate and a compound of at least one element selected from silicon, chromium, and phosphorus.

Most polymers can be used as the binder providing they are soluble in water or else form a stable emulsion (latex) when put into suspension in water.

By way of example, such polymers are polymers of acrylic acid (PAAc), of methacrylic acid, of sulfonic acid, of itaconic acid, salts thereof (e.g. with $Li^{30}$, $Na^{30}$, $K^{30}$, . . . , cations), polyacrylamides (PAA), polyamides (PA), polyvinylalcohol (PVA), precursors of polyurethanes (PU), polytetrafluoroethylene (PTFE), together with copolymers thereof and mixtures thereof. It is also possible to use phenolic resins, cellulose compounds, and elastomers.

In a first embodiment of the invention, the binder comprises at least one elastomer. Suitable elastomers that can be selected include: a copolymer of acrylonitrile and butadiene (NBR); a copolymer of acrylonitrile and hydrogenated butadiene (HNBR); a copolymer of styrene and butadiene (SBR); a copolymer of styrene and acrylonitrile (SAN); a terpolymer of acrylonitrile, butadiene, and styrene (ABS); a terpolymer of styrene, acrylonitrile, and styrene (SAS); a terpolymer of styrene, isoprene, and styrene (SIS); a terpolymer of styrene, butadiene, and styrene (SBS); a terpolymer of ethylene, propylene, and diene (EPDM); a styrene/ethylene/butene/styrene (SEBS) polymer; a polyurethane thermo-plastic rubber (PUR); a polychloroprene (CR) or 2 chloro 1-3 butadiene (e.g. known under the trade name "Neoprene"); a polyisobutylene (PIB); a polyisoprene; a polybutadiene; an ethylene/propylene copolymer (EPR); a copolymer of ethylene and vinyl acetate (EVA); a copolymer of ethylene and acrylic ester (EMA, EEA, . . .); and mixtures thereof.

Said elastomer is preferably selected from styrene/butadiene copolymer (SBR) and acrylonitrile/butadiene copolymer (NBR).

In a second embodiment of the invention, the binder comprises at least one cellulose compound. The binder can be a cellulose compound selected from: a methyl cellulose (MC); a carboxymethylcellulose (CMC); a hydroxyethylcellulose (HEC); and a hydroxypropylmethylcellulose (HPMC).

Said cellulose compound is preferably a salified carboxymethylcellulose (CMC) having a mean molecular weight of not less than 200,000.

In a third embodiment of the invention, said binder comprises at least one elastomer and at least one cellulose compound.

In a first variant, said elastomer is styrene/butadiene copolymer (SBR) and the cellulose compound is salified carboxymethylcellulose (CMC) having a mean molecular weight of not less than 200,000.

In a second variant, said elastomer is acrylonitrile/butadiene copolymer (NBR), and the cellulose compound is salified carboxymethylcellulose (CMC) having mean molecular weight of not less than 200,000.

Said binder contains 30% to 70% by weight of said cellulose compound relative to the sum of the weight of said elastomer plus the weight of said cellulose compound.

Said binder preferably contains 50% to 70% by weight of said elastomer and 30% to 50% of said cellulose compound relative to the sum of the weight of said elastomer plus the weight of said cellulose compound.

More preferably still, said binder contains 60% to 70% by weight of said elastomer and 30% to 40% by weight of said cellulose compound relative to the sum of the weight of said elastomer plus the weight of said cellulose compound.

In addition to the binder, the paste also contains an electrochemically active material. Said active material is selected from: a transition metal oxide; a sulfide such as $Li_3MoS_3$, $LiTiS_2$, $Li_3NiPS_3$, or $Li_4V_2S_5$, for example; a sulfate, e.g. $Fe(SO_4)_2$ or $Ni(SO_4)_2$, for example; and mixtures thereof.

Said transition metal oxide is preferably selected from: vanadium oxide ($V_2O_5$); and lithiated oxides based on manganese ($LiMnO_2$, $LiMn_2O_4$), on iron ($LiFeO_2$), on nickel ($LiNiO_2$), and on cobalt ($LiCoO_2$), optionally doped by at least one element selected in particular from magnesium, calcium, strontium, barium, titanium, zirconium, vanadium, chromium, manganese, iron, cobalt, nickel, zinc, boron, aluminum, and mixtures thereof.

The invention also provides a lithium rechargeable electrochemical cell comprising an electrode, at least one negative electrode, and at least one positive electrode of the present invention.

The active material of the negative electrode is preferably a carbon-containing material suitable for inserting lithium into its structure. The active material of the anode can be selected from carbons, in particular crystallized carbons such as graphites in powder or fiber form, carbons of low crystal content that are graphitizable such as cokes, or not graphitizable such as vitreous carbons or carbon blacks, and mixtures of such carbons.

However, the negative active material can also be selected from compounds containing a metal suitable for forming an alloy with lithium, such as metallic carbides, nitrides, sulfides, and oxides.

The electrolyte can be a liquid or a polymer.

In a variant, the electrolyte is liquid and comprises at least one lithium salt dissolved in at least one organic solvent.

In another variant, the electrolyte comprises at least one polymer matrix and a lithium salt.

The lithium salt is selected from: lithium perchlorate $LiClO_4$; lithium hexafluoroarsenate $LiAsF_6$; lithium hexafluorophosphate $LiPF_6$; lithium tetrafluoroborate $LiFB_4$; lithium trifluoromethanesulfonate $LiCF_3SO_3$; lithium trifluoromethanesulfonimide $LiN(CF_3SO_2)_2$ or "LiTFSI"; and lithium trifluoromethanesulfonemethide $LiC(CF_3SO_2)_3$ or "LiTFSM".

The organic solvent comprises an ether, an ester, or a mixture of ethers and/or esters, the ester being selected from linear carbonates, and cyclic carbonates having more than four carbon atoms. Said organic solvent preferably comprises at least: an ester selected from a carbonate such as propylene carbonate, ethylene carbonate, butylene carbonate, diethyl carbonate, and dimethyl carbonate; an acetate such as ethyl acetate; a propionate; or a butyrate such as methyl butyrate.

The present invention also provides a method of manufacturing a positive electrode for a lithium rechargeable electrochemical cell, the electrode having an aluminum current collector, a paste containing an electrochemically active material, and a binder.

In a first implementation of the invention, said method comprises the following steps:
  a paste is made by adding an electrochemically active material in powder form to a binder in solution or in suspension in water;
  to form an electrode, said paste is spread on the aluminum current collector which is covered in a protective layer constituted by at least one component selected from an oxalate and a compound of at least one element selected from silicon, chromium, and phosphorus;
  said electrode is dried at a temperature lying in the range 40° C. to 120° C. to evaporate the water; and
  said electrode is compressed at ambient temperature until porosity is obtained that preferably lies in the range 30% of the 40% of the total volume of the electrode.

In a second variant of the invention, the method comprises the following steps:
  a paste is made by adding an electrochemically active material in powder form and at least one component selected from an oxalate, a silicate, a chromate, a phosphate, and a phosphochromate to a binder in solution or in suspension in water;
  said paste is spread on an aluminum current collector to form an electrode;
  said electrode is dried at a temperature lying in the range 40° C. to 120° C. to evaporate the water; and
  said electrode is compressed at ambient temperature to obtain porosity that preferably lies in the range 30% to 40% of the total volume of the electrode.

Said component is preferably selected from: sodium monosilicate $SiO_2NaOH$; sodium metasilicate $Na_2SiO_3$;

potassium chromate $K_2CrO_4$; and potassium bichromate $K_2Cr_2O_7$. More preferably, said component is sodium metasilicate $Na_2SiO_3$.

In a first implementation of the invention, the binder has at least one elastomer. Said elastomer is preferably selected from a styrene/butadiene copolymer (SBR) and an acrylonitrile/butadiene copolymer (NBR).

In a second implementation of the invention, the binder comprises at least one cellulose compound. Said cellulose compound is preferably salified carboxymethylcellulose (CMC) having mean molecular weight of not less than 200,000.

In a third implementation of the invention, said binder comprises at least one elastomer and at least one cellulose compound. Said cellulose compound is preferably salified carboxymethylcellulose (CMC) of mean molecular weight not less than 200,000, and said elastomer is selected from a styrene/butadiene copolymer (SBR) and an acrylonitrile/butadiene copolymer (NBR).

Said binder contains 30% to 70% by weight of said elastomer and 30% to 70% of said cellulose compound relative to the sum of the weight of said elastomer plus the weight of said cellulose compound. Preferably those figures are respectively 50% to 70% of said elastomer and 30% to 50% of said cellulose compound, and more preferably 60% to 70% of said elastomer and 30% to 40% of said cellulose compound.

Said active material is selected from a transition metal oxide, a sulfide, a sulfate, and mixtures thereof. Said active material is preferably a vanadium oxide, a lithiated oxide, or a lithiated oxide doped with a transition metal.

In addition, said paste may contain additives such as a conductive material or a texturing agent. This applies in particular to the positive electrode when the active material is a lithiated oxide of a transition metal. Since such oxides are naturally semiconductive, it is necessary to add a conductive material thereto, e.g. graphite, carbon, or soot, in order to increase the macroscopic conductivity of the electrode.

BRIEF DESCRIPTION OF THE DRAWING

Other characteristics and advantages of the present invention appear from the following examples, which are naturally given by way of non-limiting illustration, and from the accompanying drawing where the sole FIGURE shows a button-format cell containing an electrode of the present invention.

MORE DETAILED DESCRIPTION

Corrosion of an aluminum current collector in the presence of water was evaluated as follows.

The collector was made of aluminum referenced "1085", suitable for being covered in a protective layer obtained by treatment, in particular using a solution containing a chromate or a mixture of phosphate and chromate. The collector was put into contact with a solution containing an electrochemically active material in suspension in water. In some cases the solution also contained a component such as potassium bichromate $K_2Cr_2O_7$ or sodium metasilicate $Na_2SiO_3$. After 30 minutes, the collector was rinsed in deionized water and was examined to detect whether any corrosion had occurred.

When corrosion did take place, bubbles were observed when the collector was put into contact with the solution. After rinsing, the surface of the collector had a damaged appearance.

The results obtained are summarized in Table 1 below.

In general, it can be seen firstly that the aluminum collector was corroded in all cases by the solution when it did not contain the additional compound, and secondly that a collector which had previously been protected by chromate or phosphochromate treatment was never corroded.

The addition of potassium bichromate $K_2Cr_2O_7$ to the solution at a concentration of 1 gram per liter (g/l) of water or the addition of sodium metasilicate $Na_2SiO_3$ at a concentration of 10 g/l of water eliminated corrosion in all cases.

TABLE 1

| Active material | Collector | $H_2O$ | $+K_2Cr_2O_7$ 0.1 g/l water | $+K_2Cr_2O_7$ 1 g/l water | $+Na_2SiO_3$ 0.1 g/l water | $+Na_2SiO_3$ 1 g/l water | $+Na_2SiO_3$ 10 g/l water |
|---|---|---|---|---|---|---|---|
| $LiNiO_2$ | Al 1085 | heavy corrosion | corrosion | no corrosion | corrosion | corrosion | no corrosion |
|  | chromium-plated Al | no corrosion |  |  |  |  |  |
|  | phosphochromium-plated Al | no corrosion |  |  |  |  |  |
| Co doped $LiNiO_2$ | Al 1085 | heavy corrosion | corrosion | no corrosion | corrosion | corrosion | no corrosion |
|  | chromium-plated Al | no corrosion |  |  |  |  |  |
|  | phosphochromium-plated Al | no corrosion |  |  |  |  |  |
| Co and Al doped $LiNiO_2$ | Al 1085 | heavy corrosion | corrosion | no corrosion | corrosion | corrosion | no corrosion |
|  | chromium-plated Al | no corrosion |  |  |  |  |  |
|  | phosphochromium-plated Al | no corrosion |  |  |  |  |  |
| Co and Mg doped $LiNiO_2$ | Al 1085 | heavy corrosion | corrosion | no corrosion | corrosion | corrosion | no corrosion |
|  | chromium-plated Al | no corrosion |  |  |  |  |  |
|  | phosphochromium-plated Al | no corrosion |  |  |  |  |  |
| $LiCoO_2$ | Al 1085 | corrosion | no corrosion | no corrosion | corrosion | no corrosion | no corrosion |
|  | chromium-plated Al | no corrosion |  |  |  |  |  |
|  | phosphochromium-plated Al | no corrosion |  |  |  |  |  |
| $LiMn_2O_4$ | Al 1085 | light corrosion | no corrosion | no corrosion | no corrosion | no corrosion | no corrosion |

TABLE 1-continued

| Active material | Collector | $H_2O$ | $+K_2Cr_2O_7$ 0.1 g/l water | $+K_2Cr_2O_7$ 1 g/l water | $+Na_2SiO_3$ 0.1 g/l water | $+Na_2SiO_3$ 1 g/l water | $+Na_2SiO_3$ 10 g/l water |
|---|---|---|---|---|---|---|---|
| | chromium-plated Al | no corrosion | | | | | |
| | phosphochromium-plated Al | no corrosion | | | | | |

Electrodes were manufactured as follows.

A paste was prepared comprising an active material, a carbon-based conductive material, and a binder in solution or suspension in an appropriate solvent.

The electrode was shaped by coating the paste onto an aluminum foil. The solvent was then evaporated by drying at 120° C., after which the electrode was compressed.

When corrosion occurred, a reaction could be observed between the paste and the collector while the paste was being coated onto the aluminum foil, with the reaction being observable mainly by gas being given off. After drying, the electrode was crazed and perforated.

The electrodes were then evaluated electrochemically in an electrochemical cell 1 of button format as shown in the sole FIGURE.

The positive electrode 2 was placed in the cup 3 of the cell 1. The separator 4 was constituted by two sheets of microporous polypropylene, having commercial reference "CELGARD 2502", sandwiching a polypropylene felt of trademark "VILEDON" serving as an electrolyte reservoir. The negative electrode 5 was a disk of metallic lithium having a diameter of 15 mm. A stainless steel spacer 6 served to pick up current, and a spring 7 kept the various elements of the cell 1 in contact with one another.

The electrochemical stack was impregnated with an electrolyte constituted by a 1M solution of lithium hexafluorophosphate $LiPF_6$ in a mixture of organic solvents. After the electrolyte had been introduced, the cell 1 was closed in leakproof manner with a cover 8 and a gasket 9.

When the cathode electrochemically active material was a mixed lithiated oxide of nickel, cobalt, and aluminum, the electrolyte solvent was a mixture comprising 20% by weight propylene carbonate (PC), 20% by weight ethylene carbonate (EC), and 60% by weight dimethyl carbonate (DMC), in which 5% by weight of vinylene carbonate (VC) had been added.

When the cathode electrochemically active material was a lithiated oxide of cobalt or a lithiated oxide of manganese, the electrolyte solvent was made up of 40% by weight ethylene carbonate (EC), 40% by weight dimethyl carbonate (DMC), and 20% by weight diethyl carbonate (DEC).

Electrochemical testing at ambient temperature (20° C.) was performed under the following conditions, where Ic is the current theoretically required for discharging the nominal capacity Cn of said cell in one hour:

charging at 0.05 Ic to a stop voltage depending on the cathode active material; and then discharging at 0.05 Ic to a stop voltage of 3 volts.

When the cathode electrochemically active material was a lithiated nickel oxide doped with cobalt and aluminum, charging was stopped at 4.1 V.

When the cathode electrochemically active material was a lithiated cobalt oxide, charging was stopped at 4.2 V.

When the cathode electrochemically active material was a lithiated manganese oxide, charging was stopped at 4.3 V.

For each electrode, the capacity charged during the first cycle Cc and the capacity discharged during the second cycle Cd were measured in mAh/g of active material, and the cycling efficiency Rt was calculated as a %.

The cycling test at high temperature was performed after two cycles at ambient temperature. Twenty-five cycles were performed at 60° C. as follows:

charging at 0.1 Ic to a stop voltage that depends on the cathode active material (4.1 V, 4.2 V, or 4.3 V); and then discharging at 0.2 Ic to a stop voltage of 3 volts.

For each electrode, the loss of capacity during 25 cycles $F_{25}$ was measured expressed as a mean percentage loss per cycle, relative to the capacity measured during the first cycle at 60° C.

EXAMPLE 1

A prior art electrode was made in the manner described above using a paste comprising 86% by weight of active material which was a lithiated oxide of nickel doped with cobalt and aluminum of the form $LiNi_{1-x-y}CO_xAl_yO_2$, 8% by weight of a carbon-based conductive material, and 6% of weight of a binder which was polyvinylidene fluoride (PVDF) in solution in N-methylpyrolidone (NMP).

EXAMPLE 2

A prior art electrode was made using the above-described method based on a paste comprising 86% by weight of active material which was a cobalt oxide $LiCoO_2$, 8% by weight of a carbon-based conductive material, and 6% by weight of a binder which was polyvinylidene fluoride (PVDF) in solution in N-methylpyrolidone (NMP).

EXAMPLE 3

A prior art electrode was made using the above-described method on the basis of a paste comprising 90% by weight of active material which was a manganese oxide $LiMn_2O_4$, 4% by weight of a carbon-based conductive material, and 6% by weight of a binder which was polyvinylidene fluoride (PVDF) in solution in N-methylpyrolidone (NMP).

EXAMPLES 4 TO 6

Prior art electrodes were respectively analogous to those of Examples 1 to 3 with the exception that the binder comprised 2% by weight of acrylonitrile/butadiene copolymer (NBR) in suspension at 41% by weight in water and 2% by weight of salified carboxymethyl-cellulose (CMC) in solution at 2% in water.

The active materials used in Examples 4, 5, and 6 were the same respectively as that used in Examples 1, 2, and 3.

EXAMPLE 7

An electrode of the invention was made analogous to the electrode of Example 4, with the exception that potassium bichromate $K_2Cr_2O_7$ was added to the paste at a concentration of 0.1% by weight.

EXAMPLE 8

An electrode of the invention was made analogous to the electrode of Example 5, with the exception that potassium bichromate $K_2Cr_2O_7$ was added to the paste at a concentration of 0.5% by weight.

EXAMPLE 9

An electrode of the invention was made analogous to the electrode of Example 4, with the exception that sodium metasilicate $Na_2SiO_3$ was added to the paste at a concentration of 0.9% by weight.

EXAMPLE 10

An electrode of the invention was made analogous to the electrode of Example 4, with the exception that sodium metasilicate $Na_2SiO_3$ was added to the paste at a concentration of 0.3% by weight.

EXAMPLES 11 AND 12

Electrodes of the invention were made analogous respectively to the electrodes of Examples 5 and 6, with the exception that sodium metasilicate $Na_2SiO_3$ was added to the paste at a concentration of 0.1% by weight.

EXAMPLE 13

An electrode of the invention was made analogous to the electrode of Example 4, with the exception that sodium monosilicate $SiO_2NaOH$ was added to the paste at a concentration of 1% by weight.

EXAMPLES 14 AND 15

Electrodes of the invention were made analogous respectively to those of Examples 4 and 5, with the exception that the aluminum foil was previously protected by treatment using phosphochromates prior to coating it in paste.

Once the collector had been cleaned, it was treated by being immersed in a solution containing chromic acid anhydride, phosphoric acid, and hydrofluoric acid. The resulting film contained a hydrated compound of phosphorus and of chromium.

EXAMPLES 16 AND 17

Electrodes of the invention were made analogous respectively to those of Examples 4 and 5, with the exception that the aluminum foil had previously been protected with chromates prior to being coated in paste.

Once the collector had been cleaned, the treatment consisted in immersion in a solution containing chromic acid anhydride and hydrofluoric acid. The resulting film contained a hydrated compound of chromium.

All of the electrochemical evaluation results are put together in Table 2 below.

Going from a method using an organic solvent (Examples 1 to 3) to a method using an aqueous medium (Examples 4 to 6) gave rise to corrosion of the aluminum collector which could be seen by gas being given off while the paste was being coated thereon and by the crazed appearance of the electrode after drying, and which gave rise to a drop in charged capacity on the first cycle for each given active material.

By protecting the collector, use of the electrodes in an aqueous medium did not give rise to any apparent corrosion (no gas was given off). The capacities charged on the first cycle were of the same order of magnitude as those for electrodes manufactured with a non-aqueous method. The aluminum collectors of electrodes of the present invention were not corroded while the aqueous paste was being applied.

In addition, it can be seen that the cycling stability of the electrodes of the invention is better than that of prior art electrodes. Thus no subsequent corrosion of the collector occurs.

TABLE 2

| Example | Buffer | Active material | Additive in the paste | Collector | Gas given off? | Cc (mAh/g) | Cd (mAh/g) | Rt (%) | $F_{25}$ (cycle %) |
|---|---|---|---|---|---|---|---|---|---|
| 1 | PVDF | $LiNi_{1-x-y}Co_xAl_yO_2$ | no | Al | no | 184 | 142 | 77 | 0.36 |
| 4 | NBR/CMC | $LiNi_{1-x-y}Co_xAl_yO_2$ | no | Al | yes | 156 | 132 | 85 | 0.65 |
| 7 | NBR/CMC | $LiNi_{1-x-y}Co_xAl_yO_2$ | $K_2Cr_2O_7$ (0.1%) | Al | no | 170 | 127 | 75 | — |
| 9 | NBR/CMC | $LiNi_{1-x-y}Co_xAl_yO_2$ | $Na_2SiO_3$ (0.9%) | Al | no | 183 | 141 | 77 | 0.23 |
| 10 | NBR/CMC | $LiNi_{1-x-y}Co_xAl_yO_2$ | $Na_2SiO_3$ (0.3%) | Al | no | 181 | 143 | 79 | 0.10 |
| 13 | NBR/CMC | $LiNi_{1-x-y}Co_xAl_yO_2$ | $SiO_2NaOH$ (1%) | Al | no | 175 | 140 | 80 | 0.18 |
| 14 | NBR/CMC | $LiNi_{1-x-y}Co_xAl_yO_2$ | no | phosphochromium-plated Al | no | 184 | 149 | 81 | 0.12 |
| 16 | NBR/CMC | $LiNi_{1-x-y}Co_xAl_yO_2$ | no | chromium-plated Al | no | — | — | — | — |
| 2 | PVDF | $LiCoO_2$ | no | Al | no | 149 | 133 | 89 | 0.10 |
| 5 | NBR/CMC | $LiCoO_2$ | no | Al | yes | 113 | 102 | 90 | 0.31 |
| 8 | NBR/CMC | $LiCoO_2$ | $K_2Cr_2O_7$ (0.05%) | Al | no | 137 | 123 | 90 | — |
| 11 | NBR/CMC | $LiCoO_2$ | $Na_2SiO_3$ (0.1%) | Al | no | 140 | 135 | 96 | 0.13 |
| 15 | NBR/CMC | $LiCoO_2$ | no | phosphochromium- | no | 148 | 140 | 95 | — |

TABLE 2-continued

| Example | Buffer | Active material | Additive in the paste | Collector | Gas given off? | Cc (mAh/g) | Cd (mAh/g) | Rt (%) | $F_{25}$ (cycle %) |
|---|---|---|---|---|---|---|---|---|---|
| 17 | NBR/CMC | LiCoO$_2$ | no | plated Al chromium-plated Al | no | — | — | — | — |
| 3 | PVDF | LiMn$_2$O$_4$ | no | Al | no | 121 | 115 | 95 | 0.99 |
| 6 | NBR/CMC | LiMn$_2$O$_4$ | no | Al | yes | 118 | 115 | 97 | 0.26 |
| 12 | NBR/CMC | LiMn$_2$O$_4$ | Na$_2$SiO$_3$ (0.1%) | Al | no | 124 | 118 | 95 | 0.30 |

What is claimed is:

1. A positive electrode for a lithium rechargeable electrochemical cell, the electrode comprising:

a paste containing an electrochemically active material and a binder, wherein the binder is capable of being put into solution or suspension in water; and an aluminum current collector whose surface is covered in a protective layer consisting essentially of at least one component selected from an oxalate and a hydrated compound of at least one element selected from the group consisting of silicon, chromium and phosphorus.

2. An electrode according to claim 1, in which said binder comprises at least one elastomer.

3. An electrode according to claim 2, in which said elastomer is selected from a styrene/butadiene copolymer and acrylonitrile/butadiene copolymer.

4. An electrode according to claim 1, in which said binder comprises at least one cellulose compound.

5. An electrode according to claim 4, in which said cellulose compound is salified carboxymethylcellulose having a mean molecular weight of not less than 200,000.

6. An electrode according to claim 1, in which said binder contains 30% to 70% by weight of an elastomer and 30% to 70% by weight of a cellulose compound relative to the sum of the weight of said elastomer plus the weight of said cellulose compound.

7. An electrode according to claim 6, in which said binder contains 50% to 70% by weight of an elastomer and 30% to 50% by weight of a cellulose compound relative to the sum of the weight of said elastomer plus the weight of said cellulose compound.

8. An electrode according to claim 7, in which said binder contains 60% to 70% by weight of an elastomer and 30% to 40% by weight of a cellulose compound relative to the sum of the weight of said elastomer plus the weight of said cellulose compound.

9. An electrode according to claim 1, in which said active material is selected from the group consisting of an oxide of a transition metal, a sulfide, a sulfate, and mixtures thereof.

10. An electrode according to claim 9, in which said transition metal oxide is selected from the group consisting of an oxide of vanadium, a lithiated oxide, and a lithiated oxide doped with a transition metal.

11. A lithium rechargeable electrochemical cell comprising an electrolyte, at least one negative electrode whose active material is a carbon-containing material suitable for inserting lithium into its structure, and at least one positive electrode comprising both a paste containing an electrochemically active material with a binder, and an aluminum current collector whose surface is covered in a protective layer consisting essentially of at least one component selected from an oxalate and a hydrated compound of at least one element selected from the group consisting of silicon, chromium and phosphorus, wherein the binder is capable of being put into solution or suspension in water.

12. A lithium rechargeable electrochemical cell comprising a liquid electrolyte comprising at least one lithium salt dissolved in at least one organic solvent, at least one negative electrode whose active material is a carbon-containing material suitable for inserting lithium into its structure, and at least one positive electrode comprising both a paste containing an electrochemically active material with a binder, and an aluminum current collector whose surface is covered in a protective layer consisting essentially of at least one component selected from an oxalate and a hydrated compound of at least one element selected from the group consisting of silicon, chromium and phosphorus, wherein the binder is capable of being put into solution or suspension in water.

13. A lithium rechargeable electrochemical cell comprising an electrolyte comprising at least one polymer matrix and a lithium salt, at least one negative electrode whose active material is a carbon-containing material suitable for inserting lithium into its structure, and at least one positive electrode comprising both a paste containing an electrochemically active material with a binder, and an aluminum current collector whose surface is covered in a protective layer consisting essentially of at least one component selected from an oxalate and a hydrated compound of at least one element selected from the group consisting of silicon, chromium and phosphorus, wherein the binder is capable of being put into solution or suspension in water.

14. A cell according to claim 13, in which said electrolyte further comprises at least one organic solvent which is liquid at the operating temperature of said cell.

* * * * *